United States Patent
Zahm

(10) Patent No.: US 7,542,750 B2
(45) Date of Patent: Jun. 2, 2009

(54) DIVERSITY SYSTEM WITH IDENTIFICATION AND EVALUATION OF ANTENNA PROPERTIES

(75) Inventor: Michael Zahm, Waldbronn (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 621 days.

(21) Appl. No.: 11/155,264

(22) Filed: Jun. 17, 2005

(65) Prior Publication Data

US 2006/0025097 A1    Feb. 2, 2006

(30) Foreign Application Priority Data

Jun. 17, 2004    (EP)    .................... 04014262

(51) Int. Cl.
  *H04B 1/06*    (2006.01)
  *H04Q 7/20*    (2006.01)

(52) U.S. Cl. .................... 455/277.2; 455/133

(58) Field of Classification Search ......... 455/133–135, 455/140, 272, 277.1–277.2; 375/267, 347
See application file for complete search history.

(56) References Cited

U.S. PATENT DOCUMENTS

| | | | | |
|---|---|---|---|---|
| 4,633,519 A | * | 12/1986 | Gotoh et al. | ............ 455/277.2 |
| 5,161,252 A | * | 11/1992 | Higuchi et al. | ................ 455/78 |
| 6,141,392 A | * | 10/2000 | Hoshikuki et al. | .......... 375/347 |
| 6,278,869 B1 | | 8/2001 | Lindenmeier et al. | .... 455/277.1 |
| 6,433,749 B1 | * | 8/2002 | Thompson | .................. 343/713 |
| 6,907,283 B2 | * | 6/2005 | Carter et al. | ................ 600/509 |
| 7,106,271 B1 | * | 9/2006 | Friday | ........................ 343/853 |
| 2002/0196190 A1 | * | 12/2002 | Lim | ..................... 343/700 MS |
| 2003/0125078 A1 | | 7/2003 | Hong | ......................... 455/556 |
| 2004/0162114 A1 | * | 8/2004 | Clifford | ................... 455/562.1 |
| 2005/0105537 A1 | * | 5/2005 | Motomura | ............ 370/395.64 |

FOREIGN PATENT DOCUMENTS

| | | |
|---|---|---|
| EP | 0 440 239 A2 | 8/1991 |
| EP | 0 517 196 B1 | 10/2001 |
| JP | 10242894 | * 11/1998 |
| WO | WO 03/058847 A1 | 7/2003 |

OTHER PUBLICATIONS

European Patent Office Search Report regarding Application No. EP 04 01 4262, dated Oct. 8, 2004, 2 pages.

* cited by examiner

*Primary Examiner*—Lee Nguyen
(74) *Attorney, Agent, or Firm*—Brinks Hofer Gilson & Lione

(57) ABSTRACT

This invention provides a diversity system with identification and evaluation of antenna properties. The application also provides a method for selecting an external receiving broadcast diversity antenna. The invention makes a selection of one of the diversity antennas as efficient as possible and is able to adapt the solution found to a variety of practical situations that may arise regarding diversity reception in a vehicle. This may be accomplished by the antenna characteristics being detected and antenna selection made based on the antenna characteristics. Thus, the best reception signal will be automatically selected by the mobile broadcast receiver without human intervention or prolonged waiting time.

16 Claims, 7 Drawing Sheets

DIVERSITY SYSTEM WITH IDENTIFICATION AND EVALUATION OF ANTENNA PROPERTIES

BACKGROUND OF THE INVENTION

1. Priority Claim

This application claims the benefit of European Patent Application No. 04014262.2, filed Jun. 17, 2004. The disclosure of the above application is incorporated in its entirely herein by reference.

2. Technical Field

This application is directed to a diversity system with identification and evaluation of antenna properties. In particular, this application is directed to a mobile broadcast reception system to be used for the reception of broadcast signals in a vehicle.

3. Related Art

Modem vehicles are being equipped with more broadcast reception equipment than merely FM radio. Thus, it is becoming increasingly important to ensure quality reception as well as flexibility of use of equipment mounted in or attached to a vehicle. For example, such equipment may include terrestrial broadcast televisions, including analog, digital, DAB receivers and the like. Because the frequency band and signals for various receivers may be different, different reception antennas may be required.

To achieve quality reception similar to reception achieved in a stationary home or work environment, diversity reception antennas may be employed in mobile broadcast reception systems. Diversity reception generally implies spatial diversity. Another method that may be used is cross-polarization diversity, which may address problems associated with restricted space in vehicles.

However, a disadvantage with current diversity as employed in mobile reception systems is time varying multi-path fading, with different multi-path intensity profiles. Multi-path fading may arise in wireless broadcast as a result of reflections from stationary and non-stationary objects and is manifested as a random amplitude and phase modulation. At a receiver, multiple copies of a signal are summed together in either a constructive or destructive manner. The destructive addition of the signals may create fading dips in the signal power. The exact phase relationship, and therefore the degree of cancellation, may vary from position to position, making it possible for an antenna at location "A" to experience severe destructive cancellation and an antenna at location "B" to experience constructive addition. The distances involved depend upon frequencies used for transmission and may be small.

Diversity techniques aim to improve reception performance by allowing more than one antenna to be used with a common receiver. These antennas may be spatially separated by an appropriate distance or have different polarizations. Thus, selecting the best antenna on a dynamic basis provides some operational advantage such as automatically and dynamically recovering the highest possible signal quality. For example, multi-path fading is especially an issue in orthogonal frequency division multiplexing (OFDM) as generally utilized in digital video broadcast (DVB). OFDM is a method of digital modulation in which a signal is split into narrowband channels at different frequencies. In some respects, OFDM is similar to conventional frequency-division multiplexing (FDM). The difference, however, lies in how the signals are modulated and demodulated. Priority is given to minimizing the interference, or crosstalk, among the symbols making up the data stream. In other words, less importance is placed on perfecting individual channels.

Thus, a typical multi-path fading environment may include a signal transmitted from a transmitter received by a receiver mounted in, for example, a vehicle. In this situation, the signal transmitted may be received directly by the receiver, as well as after having been reflected off various objects in the surrounding environment such as buildings and/or trees. These different signals received are not correlated. However, for many scattering environments, spatial diversity is an effective way to improve the performance of wireless radio systems. The signals (at least two) should be received by the diversity antennas and then switched between or combined in the receiver.

A standard diversity technique is maximum ratio combining in a receiver, which means that the signal is down-converted into the base band, demodulated and then combined to optimize the signal to noise ratio. Alternatively, in switched diversity, one or the other of at least two antennas is selected and one of the antennas remains selected until the received signal strength falls below some limit of acceptability. At this point, the other antenna is switched and this process is repeated.

For example, one system may include a space diversity television broadcast receiver in a vehicle that can detect whether an antenna is connected or not, and subsequently choose the best signal of the connected antennas. In such a system, the video signal only includes the signals from the actually connected antennas, which means that harsh noise may be effectively suppressed. The harsh noise would result from the inclusion of a lacking portion of the video or audio signal resulting from the antenna connector signal during a specific period when one of the antennas is not connected. In practice, an antenna connection detection portion is included in between the respective antenna and tuner, and an unoccupied antenna connector detecting portion outputs a signal to a signal selecting controller which also feeds back into the tuner. In this way it is ascertained that only the signals from connected antennas are compared and can be selected.

Systems such as described above have been limited to a particular frequency band and determining whether an antenna is connected or not. However, frequency diversity needs to be employed because sometimes the same program is broadcast in two different frequency bands. Because any two different frequencies may experience different multi-path fading, it would be useful to receive these two different frequencies. Therefore, a need exists for a diversity system with identification and evaluation of antenna properties and more particularly to a mobile broadcast reception system to be used for the reception of broadcast signals in a vehicle which, among other things, is not limited to a particular frequency band and determining whether an antenna is connected or not.

SUMMARY

This invention provides a diversity system with identification and evaluation of antenna properties. The application also provides a method for selecting an external receiving broadcast diversity antenna. The invention makes a selection of one of the diversity antennas as efficient as possible and is able to adapt the solution found to a variety of practical situations that may arise regarding diversity reception in a vehicle. This may be accomplished by the antenna characteristics being detected and antenna selection made based on the antenna characteristics. This results in the best reception signal always being automatically selected by the mobile broadcast receiver without human intervention or prolonged waiting time.

The application also provides the further advantage that the mobile broadcast receiver may be employed with different kinds of diversity. For example, spatial diversity, cross-polar diversity and/or frequency diversity. In other words, the mobile broadcast receiver is not restricted by the antenna and/or antenna diversity design. The mobile broadcast receiver can also determine the diversity antenna circuit identifications, which has the advantage that the mobile broadcast receiver may immediately adapt to the correct antenna, frequency and modulation.

The mobile broadcast receiver may also include detectors, with each detector determining the operational characteristics of the antenna connected to it. This is advantageous because the detectors are less complex. The mobile broadcast receiver may also have only one detector, connected to a plurality of external diversity antennas through a multiplexer.

Tuning means also may be provided that may receive a digital signal, such as DAB, DVB-H and DVB-T and the like. Analog signals may be received as well. There may be a plurality of tuners that make up the tuning means, whereby each tuner may be assigned to a specific frequency band. Moreover, the mobile broadcast receiver has the advantage that the tuning means may be a Software Defined Radio. This makes the mobile broadcast system more flexible regarding the reception of signals from different frequency bands and standards.

The mobile broadcast receiver additionally may have one or more of an antenna impedance detection unit, an antenna directionality determination unit and an antenna frequency bandwidth determining unit. These operational characteristics help establish which antenna should be selected for reception of a broadcast signal.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
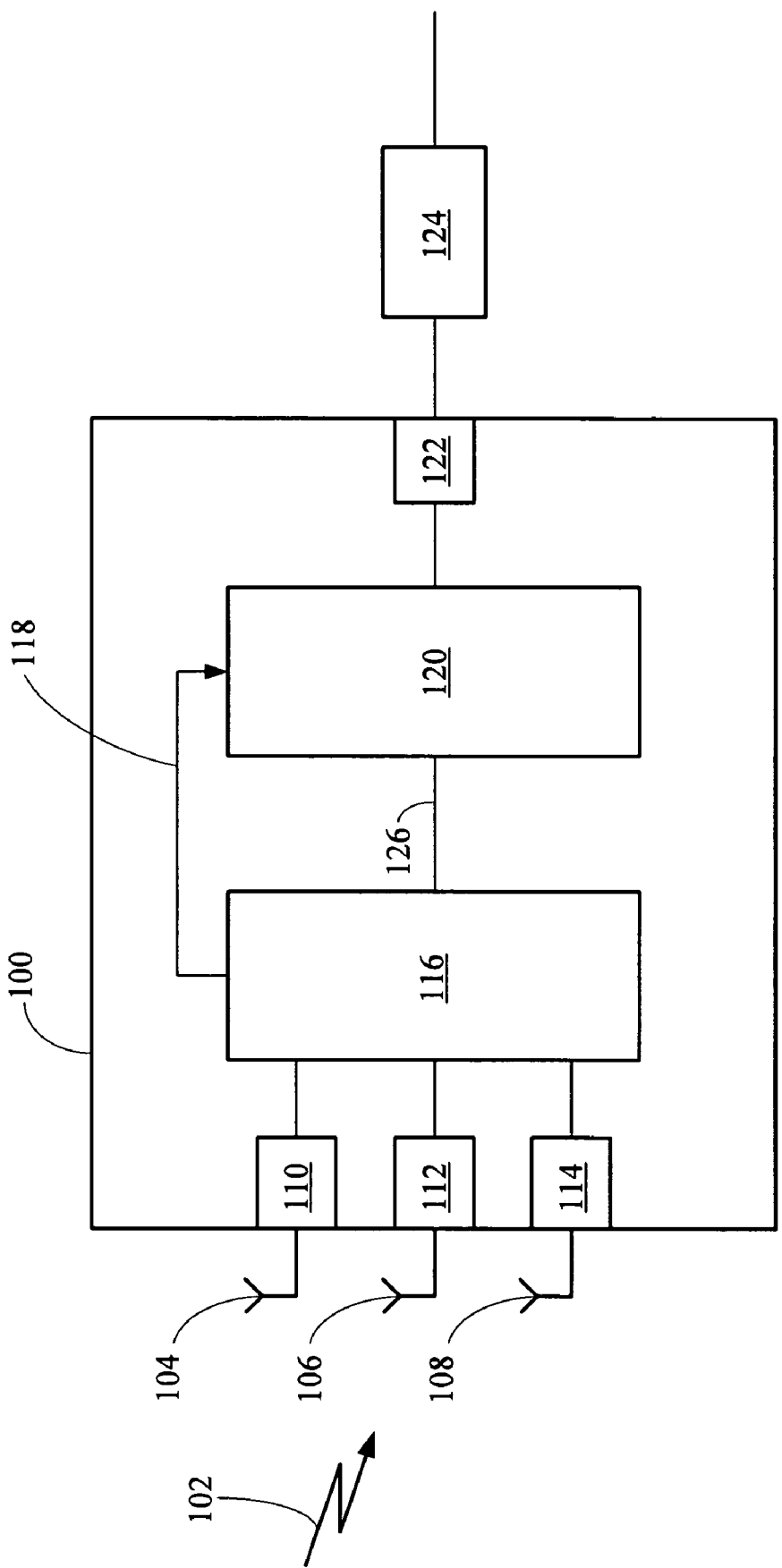
FIG. 1 illustrates an example of a mobile broadcast receiver system.

FIG. 1 shows an example of a diversity system, which may also be referred to as a mobile broadcast receiver system (MBRS), 100 with identification and evaluation of antenna properties. A broadcast signal 102 may be received by at least one of the external diversity antennas 104, 106, and 108. While a particular arrangement and number of antennas 104, 106 and 108 is shown, different arrangements and quantities of antennas are possible. The antennas 104, 106 and 108 may be frequency selective antennas for a specific frequency. For example, the antennas may be FM, VHF, UHF, DAB, DVB, or broadband antennas, or any combination of those frequency bands or even covering the whole frequency range for broadcast reception. Moreover, for example, antennas 104 and 106 may cover the same frequency band and provide spatial diversity for the MBRS 100. For this purpose, the antennas 104 and 106 may be spaced at multiples of the wavelength.

The antennas 104, 106 and 108 may be cross-polarized antennas. This means that the resulting diversity is polarization diversity. Cross-polar diversity antennas make use of the fact that in multi-path environments the broadcast signal is reflected off many different obstacles, some of which will change the polarity of the signal. The different reflectors are generally made of different materials, for example, concrete buildings, organic matter on trees, and the metals on vehicles, and therefore their reflective properties may differ. These different reflective properties may induce a change of polarization in the reflected signal. On reception with a single polarized antenna this may mean that a signal with a lesser amplitude would be received and the effect of noise or interference would be generally much greater. With a cross-polarized antenna, the signals of the two polarizations may be utilized and the best signal selected or the two signals may be combined. Frequency diversity may also be employed.

There are several different antennas commercially available for the vehicle market. In this application, the term vehicle includes an automobile, motorcycle, spaceship, airplane and/or train, or any other means of conventional or unconventional transportation. These antennas may include four-way diversity vehicle antennas in a whip style for roof installation, as well as windshield mounted cable antennas with two-way diversity for the FM, VHF and UHF bands. Roof antennas may also include analog periodic antennas over a metallic reflector. In light of the foregoing, antennas 104, 106 and 108 may be any one or a combination of these types of antennas. However, the principles of this application may apply to an antenna that is developed in the future for vehicular use.

The antennas 104, 106 and 108 may be connected to the MBRS 100 through antenna connectors 110, 112, and 114. While three antenna connectors are shown, different arrangements and quantities of antenna connectors are possible. A detector 116 detects operation characteristics of the antennas 104, 106 and 108. The operation characteristics detected by the detector 116 may be, for example, antenna impedance detection, antenna directionality determination, antenna frequency bandwidth of operation determination, information on the antenna matching circuitry, as well as other operation characteristics. The detector 116 uses the information gained to transmit a control signal 118 to the antenna selector 120. The antenna selector 120 may use the control signal 118 received from the detector 116 as well as other quality indications to choose the signal from the best antenna 104, 106 and 108 in, for example, switched diversity.

The broadcast signal 102 may also be transmitted from the detector 116 to the antenna selector 120 via a wired or wireless link 126. The antenna selector 120 selects the signal from at least one of the antennas 104, 106 and 108 and outputs the selected signal through the signal output 122 to the tuning means 124, where the received broadcast signal is turned into a visual television signal and/or an audible radio or other audio signal.

The tuning means 124 may include, but are not necessarily limited to, tuners adapted to receive any or all of the following signals: analog signals generally, digital signals generally, FM, VHF, UHF, DAB, DVB-H and/or DVB-T. The tuning means 124 that may be employed may depend on the signal received and therefore which antenna was selected by the antenna selector 120. The tuning means 124 may also include a plurality of tuners whereby each tuner may be assigned to a particular frequency band. The tuning means 124 may also include a multi-tuner front-end adapted to serve a plurality of frequency bands, an A/D converter, and/or a software demodulator adapted to demodulate a digital signal.

Figure 2:
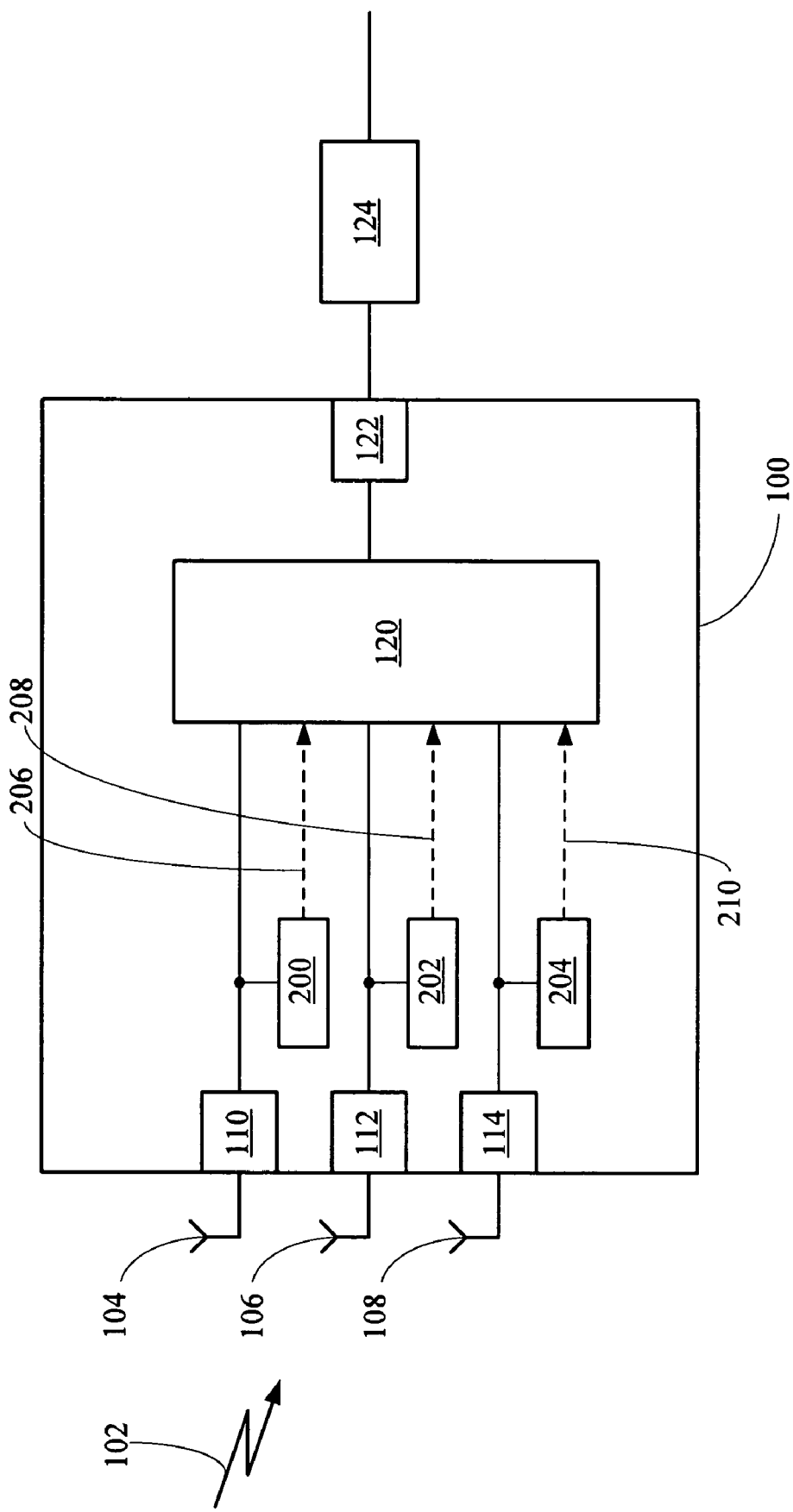
FIG. 2 illustrates an example of another mobile broadcast receiver system.

FIG. 2 shows a particular embodiment of the MBRS 100. A broadcast signal 102 may be received by the external diversity antennas 104, 106 and 108 and input to the MBRS 100 through the antenna connectors 110, 112, and 114 respectively. Each signal outputted from the antenna connectors 110, 112, and 114 may go to one of three detectors 200, 202 and 204. For example, the signal outputted from antenna connector 110 may go to detector 200, the signal outputted from antenna connector 112 may go to detector 202, and the signal outputted from antenna connector 114 may go to detector 204. It should be understood that output from each antenna connector is not limited to going to a particular connector as shown. The outputs may be wired to any one or more of detectors 200, 202 and 204. The detectors 200, 202 and 204 may detect operation characteristics of one or more of the antennas 104, 106 and 108. The operation characteristics detected by the detectors 200, 202 and 204 may be, for example, antenna impedance, antenna directionality, antenna frequency bandwidth of operation, information on the antenna matching circuitry, as well as other operation characteristics. Each detector 200, 202 and 204 may send a control signal 206, 208 and 210, respectively, to the antenna selector 120 which, as described above, selects the signal from at least one of the antennas 104, 106 and 108 and outputs the selected signal through the signal output 122 to the tuning means 124 for further processing.

In FIG. 2, each detector 200, 202 and 204 is responsible for the signal coming from one of the antennas 104, 106 and 108, respectively. This means that, under certain circumstances, each detector 200, 202 and 204 may be simplified for dealing with specific antenna characteristics. Each detector 200, 202 and 204 may measure the matching circuitry characteristics and the possible coding at the beginning of every cycle, which may occur when the MBRS 100 is turned on or when the frequency band in the tuning means 124 is switched. The operational characteristics of the antennas 104, 106 and 108 may be constantly monitored by a detector 200, 202 and 204, and a control signal may be sent to the antenna selector 120.

Figure 3:
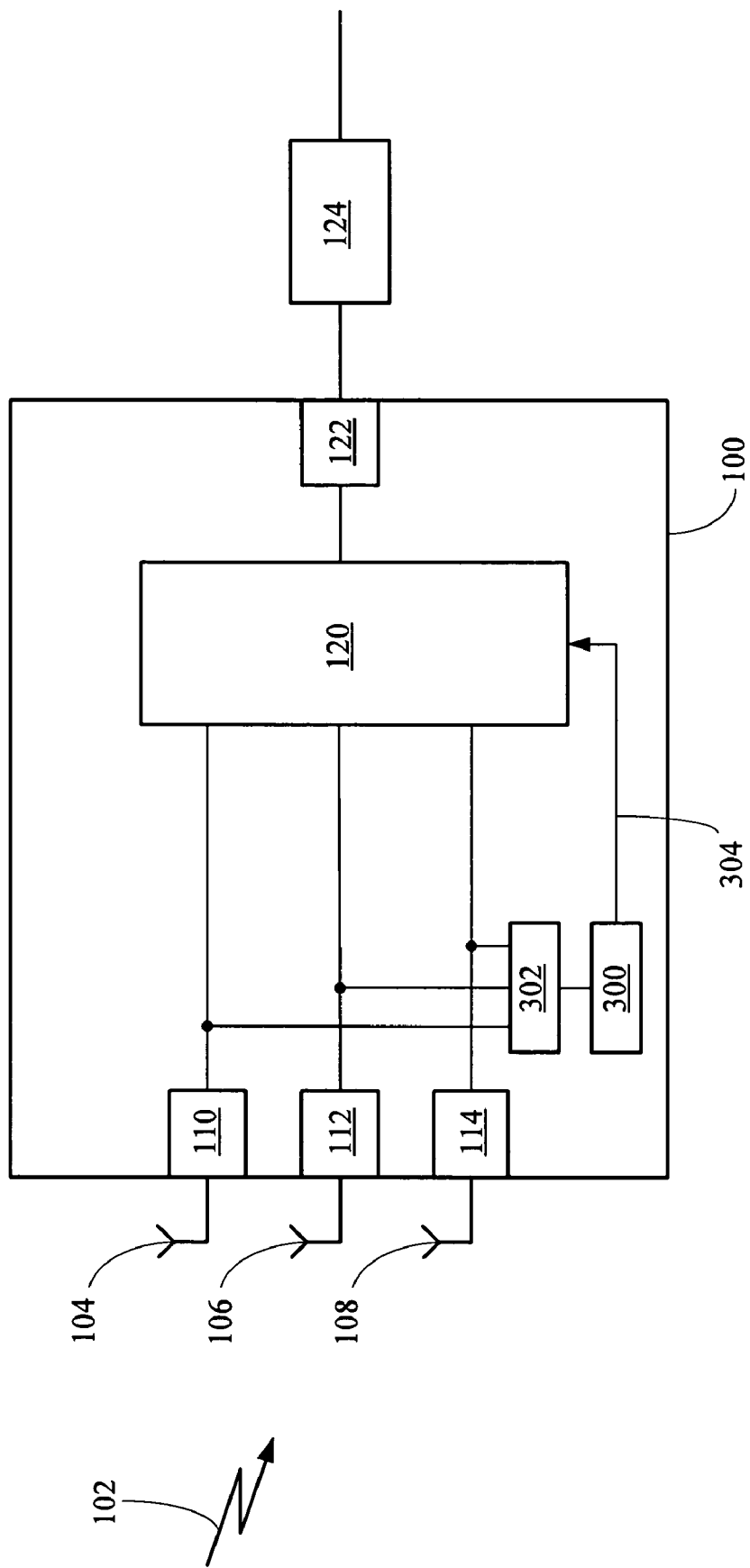
FIG. 3 illustrates an example of another mobile broadcast receiver system.

FIG. 3 shows a detector 300 that may be used for determining the antenna 104, 106 and 108 characteristics and matching circuit characteristics of all antennas 104, 106 and 108. In FIG. 3, a signal may be received by the antennas 104, 106 and 108 and input into the MBRS 100 through the connectors 110, 112 and 114. The signal may then be multiplexed by the multiplexer 302 prior to the characteristics of the antennas 104, 106 and 108 being determined in the detector 300, which in turn may send a control signal to the antenna selector 120. The signal "selected" by the antenna selector 120 may then be outputted through the connector 122 to the tuning means 124.

The detector 300 has the capability to process the range of frequencies received by the antennas 104, 106 and 108 and the capability to determine all possible antenna and matching circuitry characteristics. Thus, the detector 300 may receive FM, VHF, UHF, DAB, DVB and other signals. Within the frequency bands of the received signals there is a possibility for several different antennas and combinations of antennas for diversity. Therefore, there are also many possibilities regarding the matching circuitry, which is explained more below in reference to FIG. 4. The multiplexer 302 ensures that the detector 300 deals with one signal at a time. This is advantageous because only one detector 300 is required. For the antenna selector 120, this means that it may only receive one control signal 304 from the detector 300.

Figure 4:
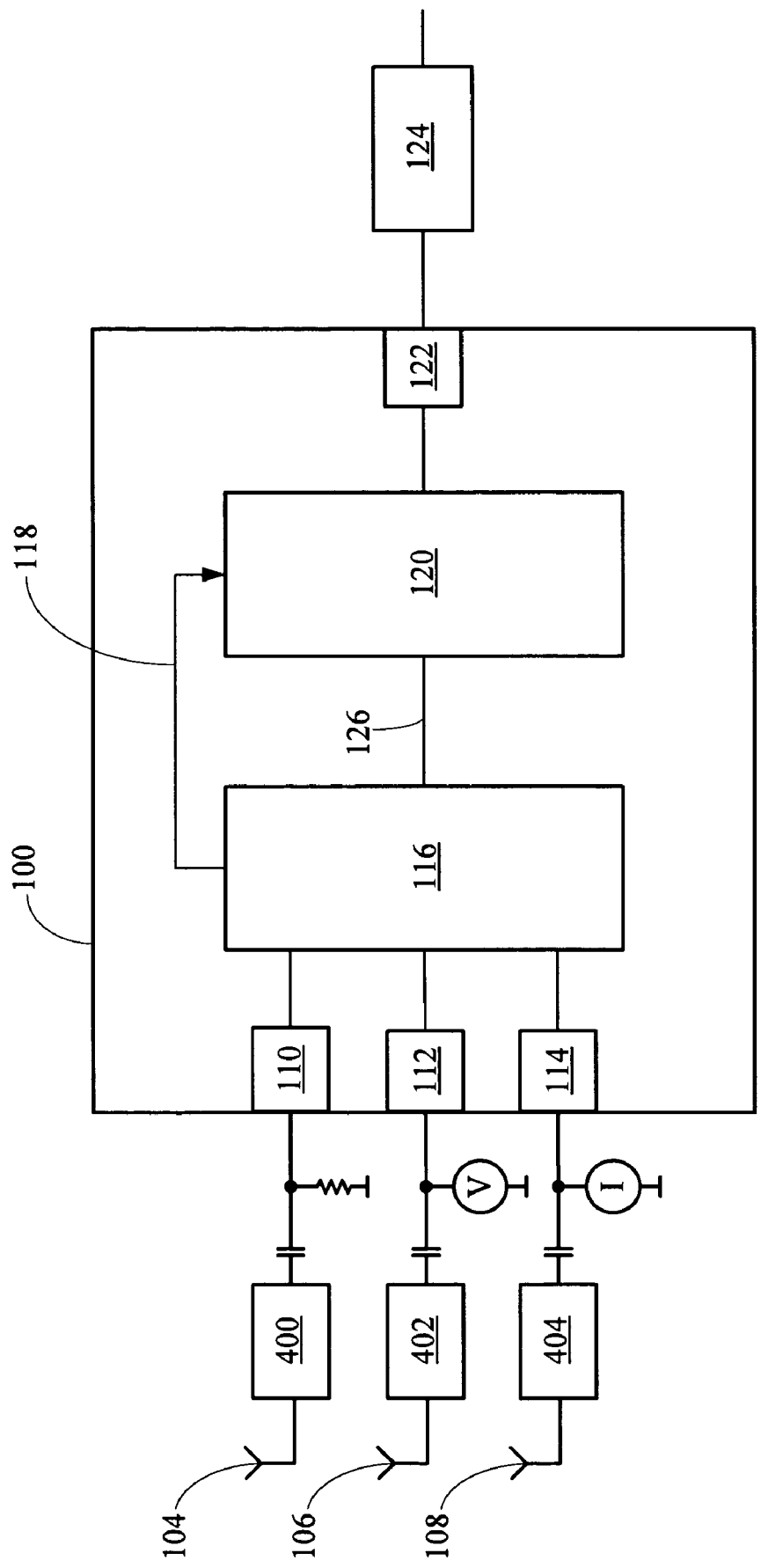
FIG. 4 illustrates an example of another mobile broadcast receiver system.

The MBRS 100, depicted in FIG. 4, is the same as that of FIG. 1. FIG. 4, however, elaborates on the possible configurations for antenna matching circuits, depicted as matching circuits 400, 402 and 404 respectively, and the coding that may be introduced. In this application, coding means may include resistors, current sources or voltage sources or the like. Such coding means is advantageous because it is a simple structure for communicating with the MBRS 100 to which antennas 104, 106 and 108 are actually connected.

FIG. 4 illustrates how a capacitor "C" may be used to decouple the antennas 104, 106 and 108 and matching circuits 400, 402 and 404 from the coding employed for each antenna from the MBRS 100. The reasons for including a code with an antenna 104, 106 and 108 are many and include potentially faster and simpler operation of the MBRS 100. If the detector 116 can detect a coded input it can forward the information to the antenna selector 120, which then has additional information on which to base its selection. The coding may be carried out for example by inserting a resistor "R" between antenna 104 and the input connector 110 and/or connecting a voltage source "V" between the antenna 106 and the input connector 112 and/or connecting a current source "I" between the antenna 108 and the input connector 114. The values of the resistor R, the voltage source V and the current source I are coded to have a specific meaning to the antenna selector 120.

Different values of the resistor R for example could be as follows and have the following meanings, but not necessarily limited as such: R=10 kΩ and may indicate a passive FM dipole which could be used for antenna diversity for the television receiver especially in band I to III channels; R=20 kΩ may, for example, be an active adhesive laminate antenna which is used for television reception and means that a preamplifier should be switched off in the RF path; R=30 kΩ could indicate a passive laminated antenna for television reception where the preamplifier in the RF path is needed. The value of the resistor R may also be used to indicate whether the receiver is actually mobile or used in a stationary home environment. If, for example, the resistor R has a value of less than 50 kΩ, this may mean that the receiver is used in its mobile mode. If, on the other hand, the value of the resistor R is greater than 50 kΩ, this could be used as an indication that the receiver is actually connected to a stationary antenna or even a cable. This may have the implication, for example, that in the home environment diversity is not required as the signal received does not suffer multipath fading.

Figure 5:
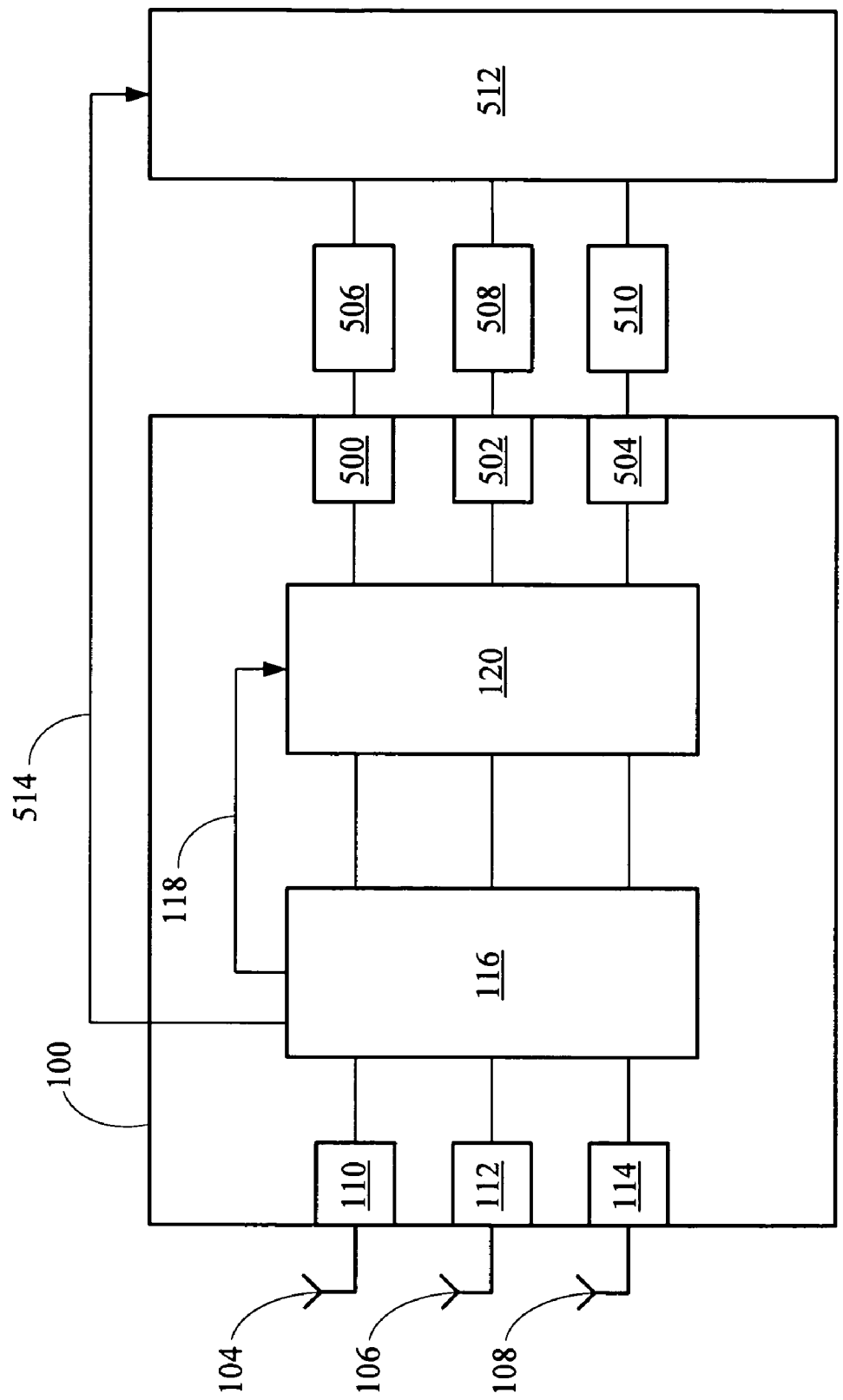
FIG. 5 illustrates an example of another mobile broadcast receiver system.

FIG. 5 illustrates an additional way in which the MBRS 100 may be used. This configuration may be used for Software Defined Radio (SDR) where the MBRS 100 outputs signals through connectors 500, 502 and 504 to tuning means 506, 508 and 510. The signal is then processed in the signal processing section 512. The tuning means in this example may be a multi-tuner front end A/D converter and a software demodulator. SDR means that radio functionality is moved into software and the analog/digital interface is moved closer to the air radio interface at the antenna. One of its advantages is that general purpose hardware may be substituted for dedicated hardware, thereby reducing production costs.

The term SDR is used to describe radios that provide software controllers for a variety of modulation techniques—wideband or narrowband operation—and waveform requirements and involving standards over a broad frequency range. The frequency bands covered may still be constrained at the front end, requiring a switch in the antenna system. SDR-enabled user devices may be dynamically programmed in software to reconfigure their characteristics for better performance. SDR offers a solution to accommodate many standards, frequency bands and applications by offering end-user devices that may be programmed, fixed or enhanced by over-the-air software. With SDR, a common hardware platform is implemented and different standards and technologies may be accommodated by software modules. Front-end processing in SDR consists of the physical air interface, the front-end radio frequency processing and any frequency up and down conversion that is necessary, as well as modulation/demodulation processing. The signal processing section 512 may be responsible for the content, information processing for the purpose of decomposition, or recovering the embedded information containing data control and timing.

The MBRS 100 allows for a more automatic deployment of the receiving antennas 104, 106 and 108. In this case, the information 514 on the antenna characteristics is also sent from the detector 116 to the signal processing section 512 and the control signal is being sent from the detector 116 to the antenna selector 120.

Figure 6:
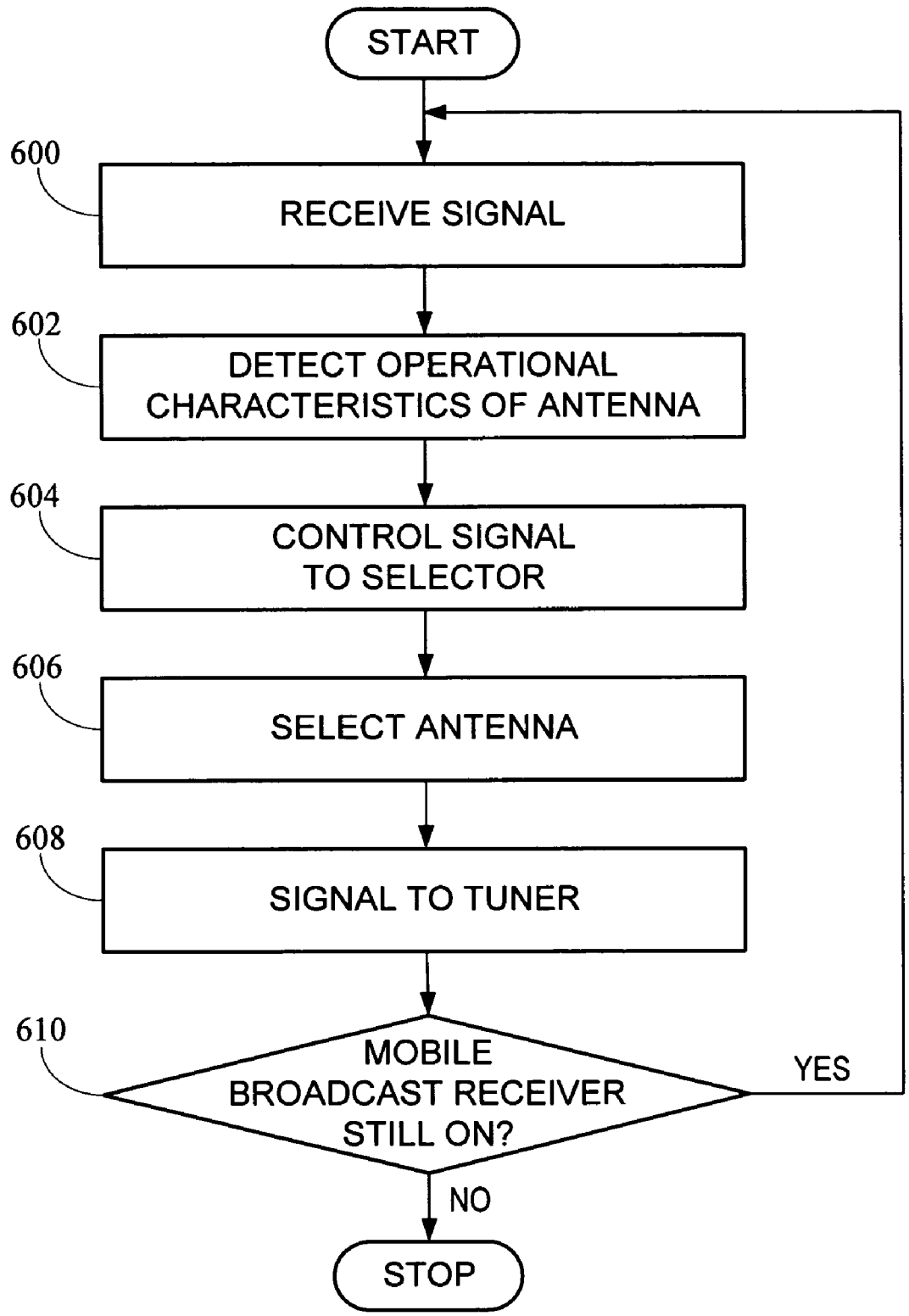
FIG. 6 illustrates an operational flow diagram for a method of selecting an external diversity antenna.

FIG. 6 illustrates in the form of a flowchart the steps that may occur in the MBRS 100. A broadcast signal may be received 600 and the operational characteristics of the antennas may be detected 602. A control signal is sent 604 to the selector, which on the basis of the control signal selects 606 one or more antennas. The signal may then be forwarded 608 to the tuner. It is then checked 610 whether the MBRS is still switched on. If it is not, the process is stopped. If the MBRS 100 is still on, the process is repeated from the reception of the signal in step 600.

Figure 7:
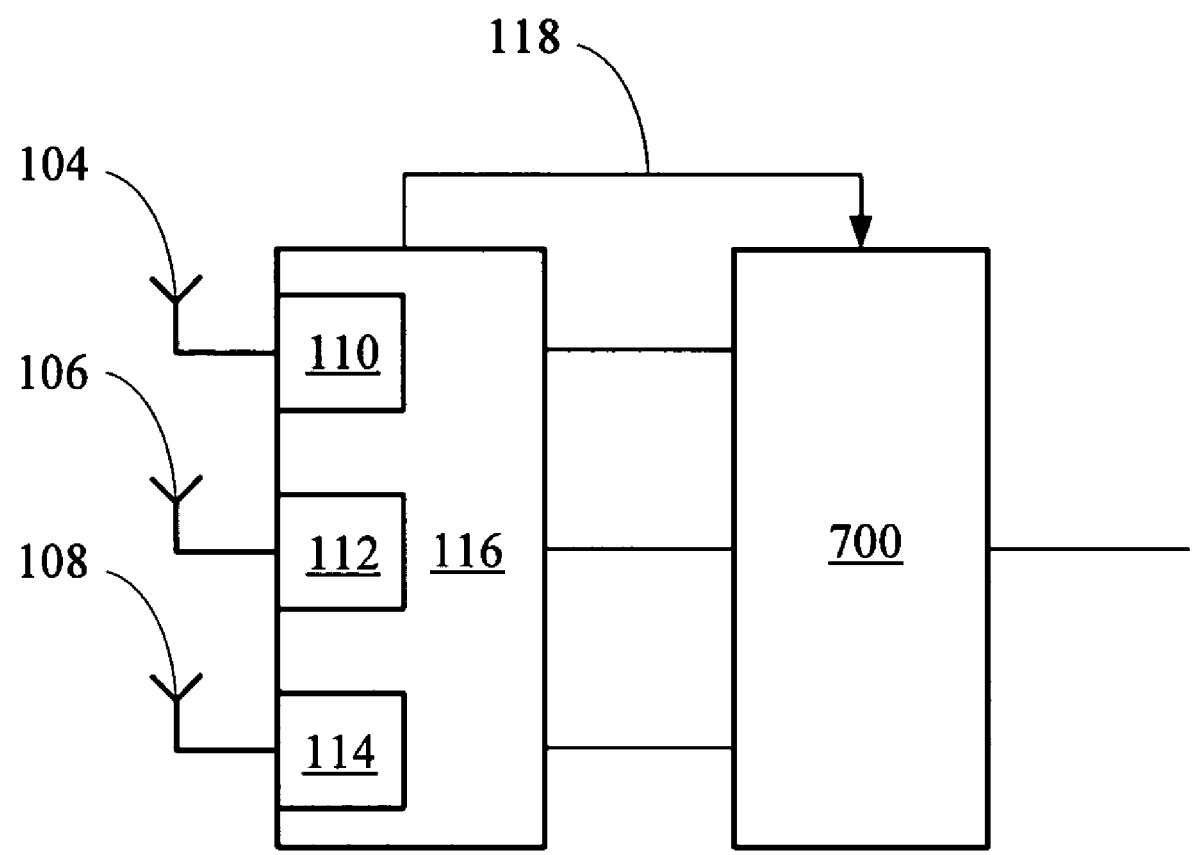
FIG. 7 illustrates an example of another mobile broadcast receiver system.

As illustrated in FIG. 7, the MBRS 100 may be further simplified by incorporating the antenna selector functionality in the tuning means 700. FIG. 7 illustrates a situation where there is no express antenna selector involved. The signal may be received by the external diversity antennas 104, 106 and 108 and fed into the detector 116 via the input 110, 112 and 114. As explained above, the detector 116 determines the antenna characteristics and outputs a control signal. The tuning means 700 may receive this control signal and select the required antenna signal for further signal processing. This means that the antenna selection preferably occurs within the tuning means 700.

What is claimed is:

1. A mobile broadcast receiver, comprising:
a plurality of antenna connectors for connecting a plurality of diversity antennas;
an antenna selector for selecting at least one of the diversity antennas;
a signal output for outputting a signal of the selected antenna to a tuning means;
a detector for determining the diversity antenna operational characteristics and for outputting a control signal based on the defined operational characteristics, where the detector is adapted to determine diversity antenna circuit identifications;
a voltage detector representing a value of a resistor in the diversity antenna circuit; and
means for applying the control signal to the antenna selector for the selection of at least one of the diversity antenna.

2. The mobile broadcast receiver of claim 1 where the diversity is spatial diversity.

3. The mobile broadcast receiver of claim 1 where the diversity is cross-polarization diversity.

4. The mobile broadcast receiver of claim 1 where the diversity is frequency diversity.

5. The mobile broadcast receiver of claim 1 where the detector is connected to a plurality of diversity antenna through a multiplexer.

6. The mobile broadcast receiver of claim 1 where the detector further comprises an antenna impedance detection unit.

7. The mobile broadcast receiver of claim 1 where the detector further comprises an antenna directionality determination unit.

8. The mobile broadcast receiver of claim 1 where the detector further comprises a detection unit for determining an antenna frequency bandwidth.

9. The mobile broadcast receiver of claim 1 further comprising a current sensor for determining a current level at the antenna connector.

10. The mobile broadcast receiver of claim 1 further comprising a voltage detector for determining a voltage level at the antenna connector.

11. A mobile broadcast receiver, comprising:
a plurality of antenna connectors for connecting a plurality of diversity antennas;
an antenna selector for selecting at least one of the diversity antennas;
a signal output for outputting a signal of the selected antenna to a multi-tuner front end A/D converter and a software demodulator;
a detector for determining the diversity antenna operational characteristics and for outputting a control signal based on the defined operational characteristics, where the detector is adapted to determine diversity antenna circuit identifications;
a voltage detector representing a value of a resistor in the diversity antenna circuit; and
means for applying the control signal to the antenna selector for the selection of at least one of the diversity antenna.

12. A mobile broadcast receiver, comprising:
a plurality of antenna connectors for connecting a plurality of diversity antennas;
a detector for determining external diversity antenna operational characteristics and for outputting a control signal based on the operational characteristics, where the detector is adapted to determine diversity antenna circuit identifications;
a voltage detector representing a value of a resistor in the diversity antenna circuit; and
a tuning means for selecting the control signal and signal processing.

13. The mobile broadcast receiver of claim 12 further comprising antenna matching circuitry.

14. The mobile broadcast receiver of claim 12 where the diversity antennas are adapted to receive analog, digital, FM, VHF, UHF, DAB, DVB-H and/or DVB-T signals.

15. A method for selecting an external receiving broadcast diversity antenna comprising the steps of:
- receiving a broadcast signal through at least one of the external diversity antennas;
- selecting at least one of the plurality of external diversity antennas;
- outputting a signal of the selected antenna to a tuning means;
- detecting operational characteristics of the external diversity antenna, outputting a control signal based on the determined operational characteristics and determining diversity antenna circuit identifications;
- detecting voltage representing a value of a resistor in the diversity antenna circuit; and
- applying the control signal to the antenna selector to select at least one of the external diversity antennas.

16. The method of claim 15, where the diversity antennas are adapted to receive analog, digital, FM, VHF, UHF, DAB, DVB-H and/or DVB-T signals.

* * * * *

UNITED STATES PATENT AND TRADEMARK OFFICE
CERTIFICATE OF CORRECTION

| | | |
|---|---|---|
| PATENT NO. | : 7,542,750 B2 | Page 1 of 1 |
| APPLICATION NO. | : 11/155264 | |
| DATED | : June 2, 2009 | |
| INVENTOR(S) | : Michael Zahm | |

It is certified that error appears in the above-identified patent and that said Letters Patent is hereby corrected as shown below:

On the Title Page

Item (30), line 1, under "Foreign Application Priority Data", replace "04014262" with --04014262.2--.

In column 8, claim 3, line 12, replace "cross -polarization" with --cross-polarization--.

Signed and Sealed this

Twenty-second Day of September, 2009

David J. Kappos
*Director of the United States Patent and Trademark Office*